UNITED STATES PATENT OFFICE.

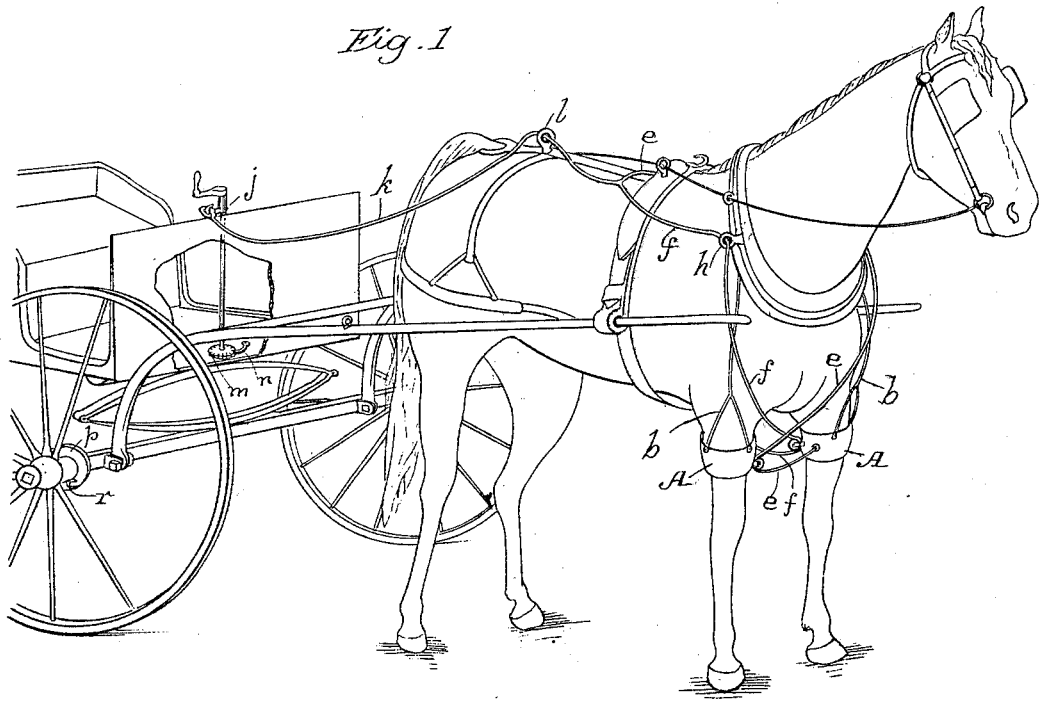

AARON BENJAMIN JOSEPH BROWN, OF SAN JOSÉ, CALIFORNIA.

DEVICE FOR STOPPING RUNAWAY HORSES.

SPECIFICATION forming part of Letters Patent No. 626,317, dated June 6, 1899.

Application filed July 15, 1898. Serial No. 686,073. (No model.)

*To all whom it may concern:*

Be it known that I, AARON BENJAMIN JOSEPH BROWN, a citizen of the United States, residing at San José, in the county of Santa Clara and State of California, have invented a certain new and useful Improvement in Devices for Stopping Runaway Horses; and I do hereby declare the following to be a full, clear, and exact description of said invention, such as will enable others skilled in the art to which it most nearly appertains to make, use, and practice the same.

The object of my invention is to provide a simple and effective apparatus for stopping runaway horses; and it consists of a pair of leggings, one of which is applied around the shoulder of each front leg of the horse, and a system of crossed reins leading from the leggings to the driver by means of which the leggings can be drawn toward each other and the extensor muscles of the fore legs cramped and drawn inward or toward each other, whereby the power of stepping or running away is so far interfered with that the animal will be rendered powerless to continue his running movement.

It also consists of a novel arrangement of the hub of the vehicle-wheel by which it is adapted as a hitching device to wind up the reins and apply the cramping action of the leggings when the horse is left standing without a driver, all as hereinafter more particularly described.

Referring to the accompanying drawings, Figure 1 represents the figure of a horse and a wagon, showing the application of my apparatus. Fig. 2 is an enlarged view of the apparatus in operative position. Fig. 3 is a perspective view of a hub of the wagon, showing the ring and hook.

Let A A represent leggings which encircle the fore legs of the horse around the shoulder above the knees. Each legging is supported by a suspender-strap $b$ from the collar, so that it is held in place and prevented from dropping down from its proper position. They fit loosely around the leg, so as not to interfere with the movement of the muscles in traveling.

$e$ and $f$ are two cords, straps, or reins. The end of one of these cords is attached to one of the leggings A, while the end of the other cord is attached to the opposite legging. Each cord or strap is then passed through a pulley $g$ on the legging opposite it, and then the two straps are crossed in front of the breast of the horse and pass up through rings $h$, attached to the hame or collar, and are united at a point just back of the turret of saddle. Thence a single cord $k$ leads through a ring or turret $l$ to the vehicle, where it can be attached to or wrapped around an upright crank-shaft $j$, just in rear of the dashboard. On the lower end of this shaft is a ratchet-wheel $m$, with which a pawl $n$ on the floor of the vehicle engages, so that the shaft can be locked at any point of its revolution.

When a fractious or runaway horse is supplied with this apparatus, he can be almost instantly stopped or subdued by drawing upon the rein $k$. If he should attempt to run or become fractious, a few turns of the crank-shaft $j$ will cause the cross-straps $e f$ to draw the leggings toward each other, and thereby not only compress and cramp the extensor muscles of the fore arm or leg, but will draw the legs toward each other, so as to render the animal powerless to exercise violent action. This will cause him to cease running, while the application does not prevent a mild and easy travel. A few applications will teach the horse that he is in the power of the driver, so that thereafter a gentle pull on the rein $k$ will be sufficient to stop or quiet him. In order to prevent the leggings from being drawn too close together, and thereby causing the animal to trip and fall, I apply a stop $o$ on each of the reins $e$ and $f$ at a proper distance inside the pulleys $g$, so that the reins or cords can only draw to a certain point. This stop may be a button or other enlargement that will not pass through the pulley.

In order to provide for applying the apparatus when the driver leaves the vehicle, I secure a projecting flange $p$ around the inner end of the hub of the vehicle and apply a hook $r$ on the inner side of the flange, or it may be applied to the hub between the spokes and flange, to which the rear end of the rein or strap $k$ is attached after being removed from the shaft $j$. The horse can then be left standing, and if he should attempt to move forward the winding of the rein or strap k on the hub will apply the cramping action of the leggings and cause him to stop.

By this means I provide a simple apparatus that will effectually stop and subdue a fractious or runaway horse. It is easily applied and does not interfere with the ordinary travel of the horse.

Having thus described my invention, what I claim, and desire to secure by Letters Patent, is—

1. An apparatus for stopping runaway horses, consisting of leggings applied around the fore legs of the horse near the shoulder; cross-straps connected with said leggings; and a pull rein or strap connecting said cross-straps within reach of the driver, substantially as described.

2. In an apparatus for stopping runaway horses, leggings applied around the fore legs of the horse near the shoulder, means for suspending said leggings from the collar or harness, a strap or cord attached to each of the leggings and passing through pulleys or rings on the opposite legging, means for drawing upon the straps and causing the leggings to be drawn toward each other, and stops applied on the reins or cords for limiting the drawing action of the cords or reins, substantially as described.

In witness whereof I have hereunto set my hand this 2d day of May, A. D. 1898.

AARON BENJAMIN JOSEPH BROWN.

Witnesses:
HARRY J. LASK,
CHAS. J. ARMBRUSTER.